United States Patent [19]

Van Schaik

[11] Patent Number: 5,379,931
[45] Date of Patent: Jan. 10, 1995

[54] SOLDERING APPARATUS WITH IMPROVED CONFIGURATION OF SOLDER STREAMS

[75] Inventor: Michiel J. Van Schaik, Breda, Netherlands

[73] Assignee: Soltec B.V., Oosterhout, Netherlands

[21] Appl. No.: 108,593

[22] PCT Filed: Jan. 7, 1993

[86] PCT No.: PCT/NL93/00003

§ 371 Date: Aug. 26, 1993

§ 102(e) Date: Aug. 26, 1993

[87] PCT Pub. No.: WO93/13904

PCT Pub. Date: Jul. 22, 1993

[30] Foreign Application Priority Data

Jan. 14, 1992 [NL] Netherlands .................... 9200060

[51] Int. Cl.6 ............................................ B23K 3/06
[52] U.S. Cl. .................................................. 228/37
[58] Field of Search ................ 228/37, 260, 180.21

[56] References Cited

U.S. PATENT DOCUMENTS

| | | | |
|---|---|---|---|
| 3,797,724 | 3/1974 | Flury et al. | 228/37 |
| 4,802,617 | 2/1989 | Deambrosio | 228/37 X |
| 4,824,010 | 4/1989 | Inoue et al. | 228/180.21 |
| 4,848,642 | 7/1989 | Kondo | 228/37 |
| 5,156,324 | 10/1992 | Hueste et al. | 228/260 X |

FOREIGN PATENT DOCUMENTS

| | | | |
|---|---|---|---|
| 0055323 | 8/1981 | European Pat. Off. | |
| 0083680 | 3/1982 | European Pat. Off. | |
| 3612361 | 4/1986 | Germany | 228/37 |
| 281768 | 11/1988 | Japan | 228/37 |

*Primary Examiner*—Kenneth J. Ramsey
*Attorney, Agent, or Firm*—Banner, Birch, McKie & Beckett

[57] ABSTRACT

The invention relates to a soldering device comprising: a vessel opened at the top for filling with solder; at least two solder towers placed in the vessel, each adapted for delivering a flow of solder on their upper side; and a transporting member for carrying along the objects for soldering above the solder towers. In order to prevent, both in the case of soldering machines which operate in a normal atmosphere and those operating in an inert atmosphere, the solder flows falling back into the vessel from splashing solder up onto the underside of the printed circuit boards, the solder towers are adapted for generating jets directed toward each other, wherein the jets intersect before they make contact with the solder level prevalent in the vessel. According to a preferred embodiment the rear tower in the direction of movement forms a jet of solder comprising a movement component counter to the movement of the objects for soldering and enclosing an acute angle with the object for soldering.

11 Claims, 2 Drawing Sheets

SOLDERING APPARATUS WITH IMPROVED CONFIGURATION OF SOLDER STREAMS

BACKGROUND OF THE INVENTION

The invention relates to a soldering machine comprising: a vessel opened at the top for filling with solder; at least two solder towers placed in the vessel, each adapted for delivering a flow of solder; from an upper portion of the tower and a transporting member for carrying along the objects for soldering above the solder towers.

Such soldering devices are generally known.

The problem often arises with such soldering devices that the solder flows falling back into the vessel cause splashes of solder which can spatter so high that they make contact with the underside of the objects for soldering such as the printed circuit boards for soldering.

This problem occurs particularly, although not exclusively, in soldering machines, wherein the soldering-process takes place inside an atmosphere of inert gas. These splashed solder droplets will make contact with the underside of the circuit board where they form solder globules. These globules adhere weakly to the other solder which is already on the circuit board so that there is a danger of them coming loose at a later time and short-circuiting another circuit portion. Although this problem occurs in the case of normal soldering machines placed in a normal atmosphere, the problem arises to a greater extent in soldering machines operating in an atmosphere substantially excluding oxygen. The low-oxygen atmosphere probably results in an increase of the surface tension, whereby the formation of droplets and globules of solder is stimulated.

The object of the present invention is to avoid the above stated problems.

This object is achieved in that the solder towers are adapted for generating solder jets directed toward each other, wherein the solder jets intersect before they make contact with the solder level prevailing in the vessel. As a result of these steps the, splashes caused by the fall of the combined solder jet on the solder level are shielded from the circuit board transported thereabove so that it is no longer possible for the solder splashes to contact the surface of the objects for soldering.

Similar problems occur when the object for soldering leaves the final solder jet. In this situation, certainly when the soldering process takes place in a nitrogen atmosphere, the solder also has the tendency to form globules on the object for soldering at the position where the solder wave leaves the object for soldering.

According to a preferred embodiment of the present invention the rear tower in the direction of movement is adapted for generating a jet of solder comprising a movement component counter to the movement of the objects for soldering.

As a result of this step any globules that may have formed are washed away by the solder jet so that the problems of such solder globules are prevented.

BRIEF DESCRIPTION OF THE DRAWINGS

The present invention will subsequently be elucidated with reference to the annexed figures, in which.

DETAILED DESCRIPTION OF THE INVENTION

Figure 1:
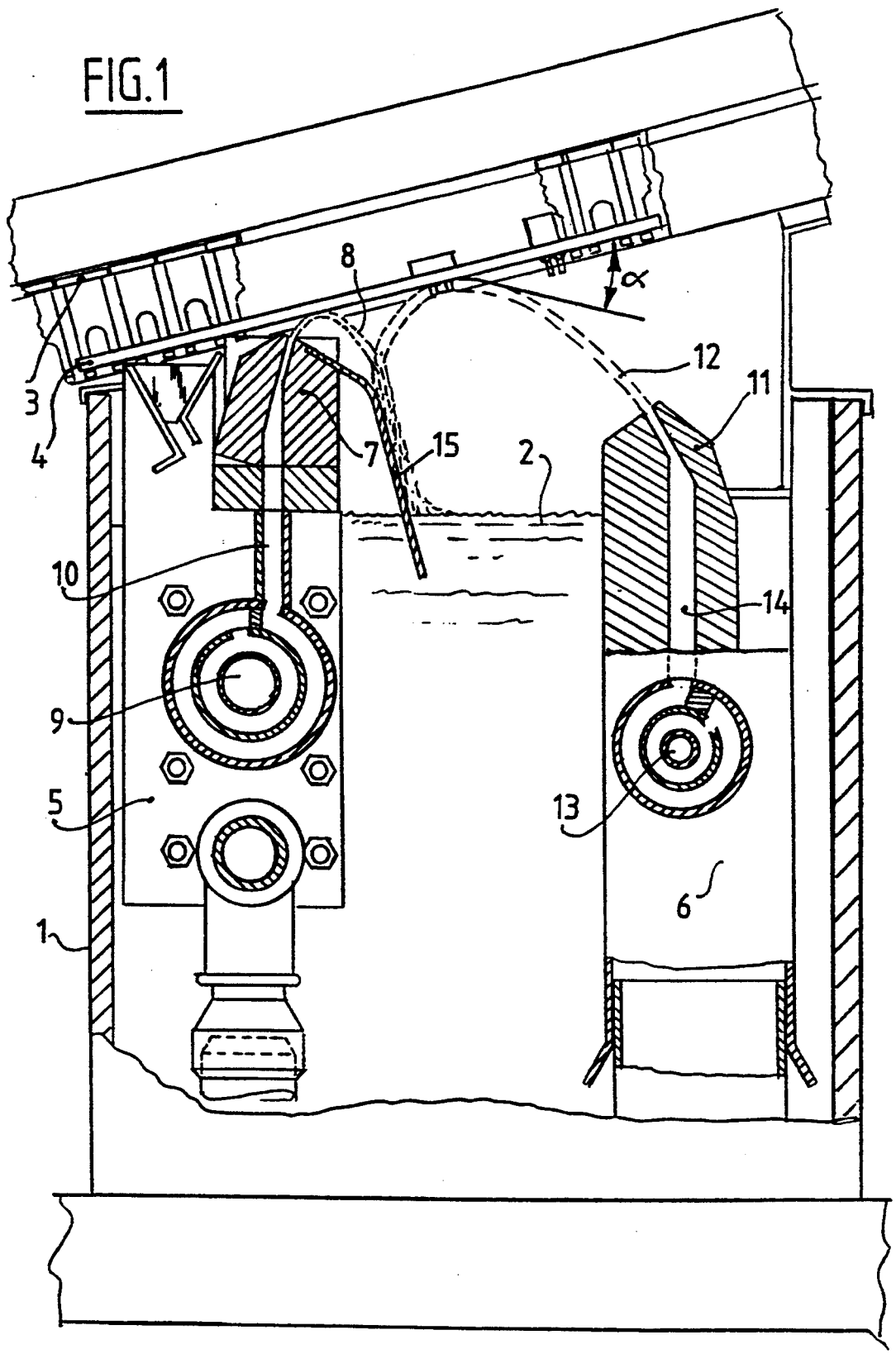
FIG. 1 shows a sectional view of a soldering device according to a first embodiment of the invention.

In the device shown in FIG. 1 the soldering device comprises a solder vessel 1 suitable for filling with solder 2. Understood by solder is any form of metal solder suitable for mutually connecting two other metals. Such a metal does not necessarily have to contain tin.

Arranged above vessel 1 is a conveyor belt 3 for transporting the objects for soldering, in the present case printed circuit boards 4. Such a conveyor belt forms the subject of the Netherlands patent application 8901014.

Two solder towers 5, 6 are further arranged in the solder vessel 1. The first solder tower is provided with a nozzle 7 which is adapted for generating a solder jet 8 which contacts the printed circuit board for soldering on the underside. Arranged in the solder tower 5 for this purpose is a pump 9 which is connected to the nozzle 7 by means of a channel 10.

The second solder tower 6 is likewise provided with a nozzle 11 with which a second solder jet 12 is generated. Arranged in the second solder tower 6 is a pump 13 which is connected to the second nozzle 11 by means of a channel 14.

It should be noted here that both pumps 9, 13 draw the molten solder out of the solder vessel 1.

After contacting the printed circuit board 4 on the underside both solder jets 8, 12 fall back into the solder bath 2.

According to the invention the solder jets 8 and 12 are oriented and have a force such that the generated solder jets make mutual contact before together reaching the level of the solder bath.

This step ensures that any splashes resulting from the falling of the solder jets into the bath cannot reach the underside of the printed circuit board. This underside is wholly shielded by the generated solder jets 8, 12 themselves.

It is noted herein, which cannot be fully seen in the drawing, that these solder jets have a breadth corresponding with the breadth of the printed circuit boards 4 for soldering.

FIG. 1 further shows how a shield 15 is fixed to the first nozzle 7. This shield provides a good guiding of the solder falling into the liquid 2.

It is remarked here that both solder jets 8, 12 are so-called unsupported solder jets, which means that they are not supported and have a partially free trajectory.

In addition the invention is intended in the first instance for use in soldering devices wherein the soldering process is performed in a non-oxidizing atmosphere, that is, in an atmosphere of a so-called protective gas. Performing the soldering treatment under the protection of a protective gas generally results in a solder connection of improved quality.

As a consequence of the fact that oxidation problems occur less in such a situation the problem arises during performing of the soldering process in such an environment that any splashes contacting the underside of the object for soldering are easily soldered fast to the object for soldering, which is undesirable. The present invention is therefore particularly for use in soldering devices which make use of a protective gas. This does not mean however that such soldering devices cannot be used on classical soldering apparatus, wherein soldering takes place in the normal oxygen-containing atmosphere. It can also occur in this situation that the spattering solder splashes adhere to the underside of the object for soldering, even though the danger thereof is smaller.

Another aspect of the present invention relates to the fact that the angle at which the rear solder jet 12 contacts the underside of the printed circuit board 4 is an acute angle. This angle is designated α in FIG. 1. This step also has the objective of preventing the so-called "drawing of fillets" by the solder. This problem arises at the location where the printed circuit board leaves the solder wave. At this position small fillets on the printed circuit board, caused for instance by components placed on the other side of the board which extend with their terminal leads through the openings arranged in the board, have the tendency to draw fillets when leaving the solder wave. Such fillets are in contact with the solder wave for a slightly longer time so that the supplied solder adheres to the fillet and the fillet becomes still longer. At some stage a maximum length of such a fillet is reached or it breaks off.

By supplying the solder wave at the smallest possible acute angle is achieved that such fillets are already washed away as they begin to develop so that they cannot grow any further. Formation of such fillets is thus prevented.

Figure 2:
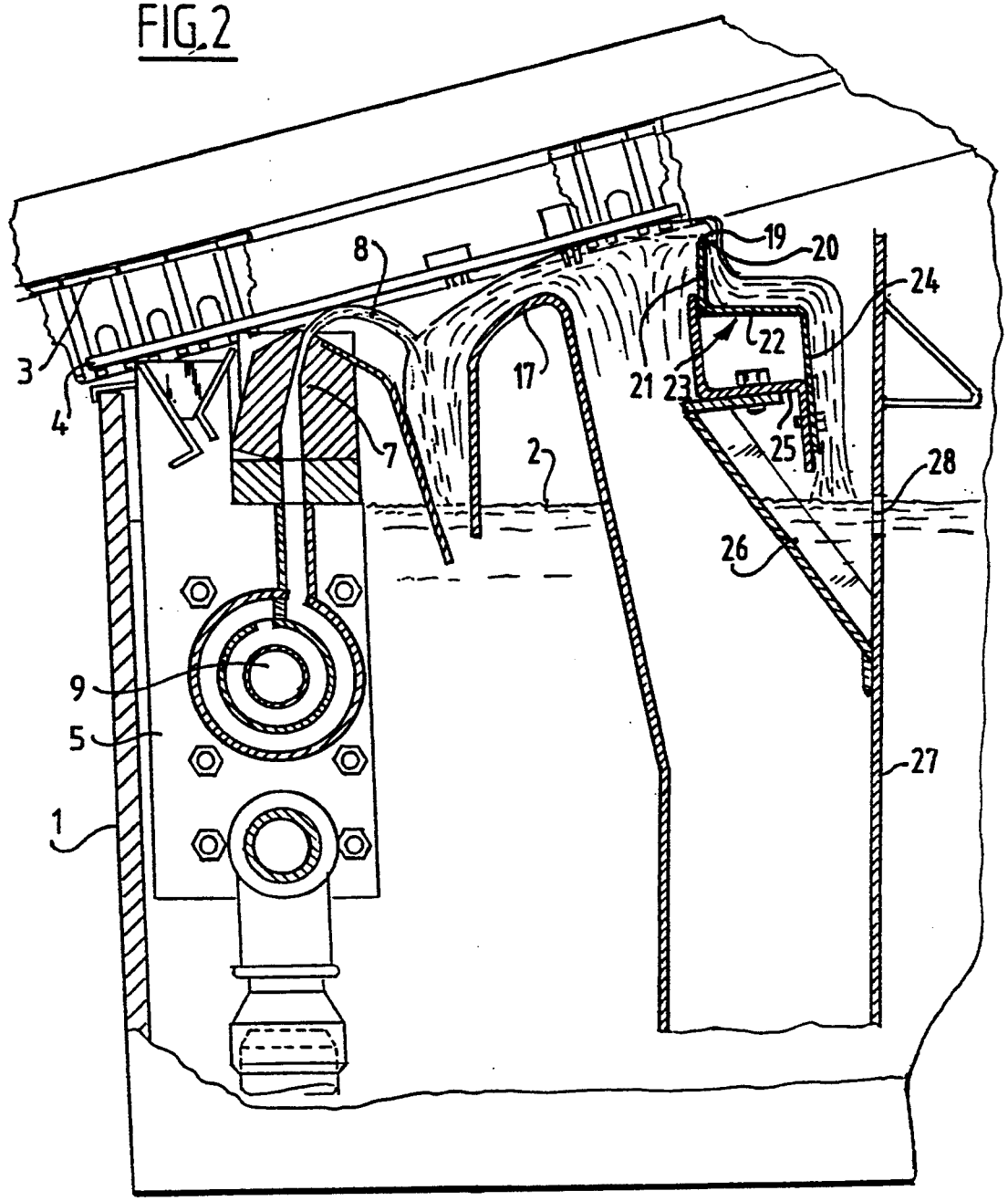
FIG. 2 is a sectional view of an alternative embodiment of the invention.

FIG. 2 shows a similar configuration, with the difference that a combination of two solder towers is applied, wherein the second solder tower delivers a solder flow which is for the greater part supported.

This device also comprises a solder vessel 1, wherein a solder tower 5 is used which corresponds with solder tower 5 in the first embodiment. The second solder tower differs, however, from the solder tower according to the first embodiment. This second solder tower 16 is provided on its front side with an overflow edge 17 so that the solder flow 18 flows away at the front over the overflow edge 17. There it meets the solder jet 8 coming from the first solder tower 5 so that both jets contact the solder level 2 together.

Placed on the other side of the second solder tower 16 is a second run-off edge 19 so that the solder flow 20 flowing away at that position flows downward along the substantially vertical wall 21.

The vertical wall 21 forms part of a plate designated in its entirety with 23. This further comprises a horizontal portion 22 and a second, lower vertical portion 24. Plate 23 is fastened for sliding in the height to a profile 25 which is fixed by means of supports 26 to a vertical plate 27. Openings 28 are arranged in the vertical plate 27. The solder flow 20 flows first along the vertical portion of plate 21 so that at the position where the solder flow leaves the printed circuit board 4 or other soldered object the direction of the flow extends substantially perpendicularly of the surface of the object for soldering. Should fillets form here when the solder flow disengages from the object for soldering these fillets cannot then cause a short-circuit as quickly as in the case the solder is disengaged at a small angle relative to the printed circuit board.

Due to the small vertical length of plate 21 a small fall height is obtained so that the creation of splashes is prevented. Splashes could in any case result in globules on the soldered object which could likewise cause short-circuit.

It is remarked here that due to the presence of gas substantially excluding oxygen the formation of fillets and globules is stimulated.

The solder flow then flows along the horizontal plate 22 and subsequently along the vertical portion 24 of plate 23. The solder flow then falls into the solder bath 2. The distance to the soldered board has in the meantime become so great that any splashes that may occur can no longer reach the object for soldering.

The second solder tower 16 is of course also provided with a pump, not shown in the drawing, for pumping upward of the solder flow.

The second solder tower moreover does not necessarily function as final solder tower; it is possible for a third solder tower to be used, the construction of which corresponds with that of the second solder tower 6 in FIG. 1.

This embodiment also prevents splashes caused by the falling of the combined solder jet onto the solder level from contacting the objects for soldering.

I claim:

1. In a soldering device comprising:
   a vessel opened on top for filling with solder;
   a succession of at least two solder towers placed in the vessel, each of said towers being adapted for delivering a flow of solder from an upper end thereof; and
   a transporting member for carrying objects to be soldered along a transport path above the solder towers for treatment by said flow of solder, the improvement comprising:
   means for shielding said objects from solder splashing up from an underlying pool of solder into which said flow of solder returns, said shielding means comprising:
   at least two of the solder towers adapted for generating respective flows of solder directed such that said respective solder flows intersect to provide an overhead cover for said underlying pool before contacting said pool of solder in the vessel; and
   at least one of said respective solder flows being a jet of solder which is self-supporting after leaving a corresponding tower and before contacting the object for soldering.

2. The improvement as claimed in claim 1, and further comprising:
   said solder flow of at least a following tower of the succession of solder towers being a jet of solder which is self-supporting after leaving said following tower and before contacting the object for soldering.

3. The improvement as claimed in claim 2, and further comprising:
   said jet of solder from said following tower having a movement component directed counter to a direction of movement of the objects for soldering along said transport path.

4. The improvement as claimed in claim 3, and further comprising:
   said solder flow of a final solder tower of said succession of towers being a solder jet which encloses an acute angle with the objects for soldering.

5. The improvement as claimed in claim 4, and further comprising:
   the acute angle being smaller than 45°.

6. The improvement as claimed in claim 2, and further comprising:
   means for at least partially supporting said solder flow returning from at least one of the towers to said underlying pool of solder.

7. The improvement as claimed in claim 2, and further comprising:
at least one of said solder flows having a greater thickness than a solder jet intersecting therewith.

8. The improvement as claimed in claim 1, and further comprising:
a final solder tower in said succession of towers having a rear side with a vertically extending overflow edge and means for limiting a height of fall of solder flowing over the overflow edge.

9. The improvement as claimed in claim 8, and said limiting means comprising:
a generally horizontally extending surface situated between said overflow edge and said pool so as to limit said fall.

10. The improvement as claimed in claim 8, and said limiting means comprised:
means for adjusting a height of the overflow edge in order to adjust said height of fall.

11. In a soldering device comprising:
a vessel opened on top for filling with solder;
a succession of at least two solder towers placed in the vessel, each of said towers being adapted for delivering a flow of solder from an upper end thereof; and
a transporting member for carrying objects to be soldered along a transport path above the solder towers for treatment by said flow of solder, the improvement comprising:
means for shielding said objects from solder splashing up from an underlying pool of solder into which said flow of solder returns, said shielding means comprising:
at least two of the solder towers adapted for generating respective flows of solder directed such that said respective solder flows intersect to provide an overhead cover for said underlying pool before contacting said pool of solder in the vessel; and
each of said respective solder flows being a jet of solder which is self-supporting after leaving the tower by which it is generated and before contacting an object for soldering.

* * * * *